US011882645B2

(12) United States Patent
Iruvanti et al.

(10) Patent No.: US 11,882,645 B2
(45) Date of Patent: Jan. 23, 2024

(54) MULTI CHIP HARDWARE SECURITY MODULE

(71) Applicant: INTERNATIONAL BUSINESS MACHINES CORPORATION, Armonk, NY (US)

(72) Inventors: Sushumna Iruvanti, Wappingers Falls, NY (US); James Busby, New Paltz, NY (US); Philipp K Buchling Rego, Wappingers Falls, NY (US); Steven Paul Ostrander, Poughkeepsie, NY (US); Thomas Anthony Wassick, LaGrangeville, NY (US); William Santiago-Fernandez, Hopewell Junction, NY (US); Nihad Hadzic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 17/451,827

(22) Filed: Oct. 22, 2021

(65) Prior Publication Data

US 2023/0130104 A1 Apr. 27, 2023

(51) Int. Cl.
*H05K 1/02* (2006.01)
*H01L 23/00* (2006.01)
*G06F 21/86* (2013.01)

(52) U.S. Cl.
CPC .......... *H05K 1/0201* (2013.01); *G06F 21/86* (2013.01); *H01L 23/57* (2013.01); *H05K 1/0275* (2013.01)

(58) Field of Classification Search
CPC .. H05K 1/0201; H05K 1/0203; H05K 1/0213; H05K 1/0275; H05K 1/0298; H05K 1/115; H05K 1/14; H05K 1/181–185; H05K 3/10; H05K 3/32; H05K 5/0208; H01L 23/57–576; G06F 21/86–88; G06F 21/55; G06F 21/554; G01N 27/045; G01D 5/16
See application file for complete search history.

(56) References Cited

U.S. PATENT DOCUMENTS

| 6,438,825 | B1 | 8/2002 | Kuhn |
| 6,665,187 | B1 | 12/2003 | Alcoe |
| 6,996,953 | B2 | 2/2006 | Perreault |
| 7,247,791 | B2 * | 7/2007 | Kulpa ................. H05K 5/0208 361/752 |
| 7,284,992 | B2 | 10/2007 | Becker |

(Continued)

FOREIGN PATENT DOCUMENTS

| CA | 2633371 C | 6/2007 |
| KR | 101083445 B1 | 7/2010 |
| WO | 2010128939 A1 | 11/2010 |

*Primary Examiner* — Amir A Jalali
(74) *Attorney, Agent, or Firm* — L. Jeffrey Kelly

(57) ABSTRACT

A laminate carrier-like module lid including multiple laminate layers of non-conductive materials stacked one atop another, sensor circuitry embedded within the laminate carrier-like module lid, the sensor circuitry providing a continuous electrical circuit surrounding the electronic components of the multi-chip module package, and thermal circuitry embedded within the laminate carrier-like module lid, the thermal circuitry comprising solid copper traces to thermally conduct heat from the electronic components of the multi-chip module package.

18 Claims, 5 Drawing Sheets

(56) References Cited

U.S. PATENT DOCUMENTS

| | | | |
|---|---|---|---|
| 7,472,836 B2 | 1/2009 | Farooq | |
| 7,703,201 B2 | 4/2010 | Oggioni | |
| 7,768,005 B2 | 8/2010 | Condorelli | |
| 7,787,256 B2 | 8/2010 | Chan | |
| 7,806,341 B2 | 10/2010 | Farooq | |
| 7,923,830 B2 | 4/2011 | Pope | |
| 8,325,486 B2 * | 12/2012 | Arshad | H05K 5/0208 |
| | | | 361/796 |
| 9,066,447 B2 | 6/2015 | Klum | |
| 9,560,737 B2 | 1/2017 | Isaacs | |
| 9,916,744 B2 | 3/2018 | Busby | |
| 10,143,090 B2 | 11/2018 | Brodsky | |
| 2006/0231633 A1 * | 10/2006 | Farooq | H01L 23/10 |
| | | | 235/492 |
| 2007/0018334 A1 * | 1/2007 | Peytavy | G06K 19/07381 |
| | | | 257/659 |
| 2007/0038865 A1 * | 2/2007 | Oggioni | G06F 21/87 |
| | | | 713/178 |
| 2009/0109024 A1 * | 4/2009 | Weidner | G06F 21/86 |
| | | | 340/540 |
| 2015/0244374 A1 * | 8/2015 | Hadley | H05K 3/32 |
| | | | 326/8 |
| 2016/0005715 A1 * | 1/2016 | Fazelpour | H01L 23/5385 |
| | | | 257/713 |
| 2017/0094805 A1 * | 3/2017 | Dangler | H05K 3/10 |
| 2017/0094820 A1 * | 3/2017 | Brodsky | H05K 5/0208 |
| 2017/0286725 A1 | 10/2017 | Lewis | |
| 2018/0092203 A1 * | 3/2018 | Dragone | H05K 1/185 |
| 2019/0384942 A1 * | 12/2019 | Dragone | H10N 30/875 |
| 2021/0280490 A1 * | 9/2021 | Gavagnin | H05K 1/0204 |
| 2023/0052484 A1 | 2/2023 | Flitsch | |

\* cited by examiner

SECTION A

SECTION B

SECTION C

MULTI CHIP HARDWARE SECURITY MODULE

BACKGROUND

The present invention generally relates to hardware security modules, and more particularly to a thermally enhanced module lid for a multi-chip hardware security module.

A hardware security module (HSM) is a physical computing device that safeguards and manages digital keys, performs encryption and decryption functions for digital signatures, strong authentication and other cryptographic functions. These modules traditionally come in the form of a plug-in card or an external device that attaches directly to a computer or network server. A hardware security module contains one or more secure crypto-processor chips.

A multi-chip module (MCM) package is a specialized electronic package where multiple integrated circuits (ICs), semiconductor dies or other discrete components are packaged onto a single substrate, facilitating their intercommunication and integration. An MCM, for example, may include a processor die, a memory die, an ASIC die, a controller die etc. in various combinations, that are interconnected and integrated to yield a high performance electronic package or module. Multi-chip module packages come in a variety of forms depending on the complexity and development philosophies of their designers. These forms can range from using pre-packaged ICs on a small printed circuit board (PCB) meant to mimic the package footprint of an existing chip package to fully customized chip packages integrating many chip dies on a High Density Interconnection (HDI) substrate.

Many activities require secure electronic communications. To facilitate secure electronic communications, an encryption/decryption system may be implemented on an electronic assembly or printed circuit board assembly that is included in equipment connected to a communications network. Such an electronic assembly is an enticing target for malefactors since it may contain codes or keys to decrypt intercepted messages, or to encode fraudulent messages. To prevent this, an electronic assembly may be mounted in an enclosure, which is then wrapped in a security sensor and encapsulated with polyurethane resin. A security sensor may be, in one or more embodiments, a web or sheet of insulating material with circuit elements, such as closely-spaced, conductive lines fabricated on it. The circuit elements are disrupted if the sensor is torn, and the tear can be sensed in order to generate an alarm signal. The alarm signal may be conveyed to a monitor circuit in order to reveal an attack on the integrity of the assembly. The alarm signal may also trigger an erasure of encryption/decryption keys stored within the electronic assembly.

SUMMARY

According to one embodiment of the present invention, a multi-chip hardware security module is provided. The multi-chip hardware security module may include a multi-chip module package comprising multiple electronic components packaged onto a laminate carrier, a two-piece laminate carrier-like module lid covering the electronic components and secured to the laminate chip carrier, wherein the two-piece laminate carrier-like module lid comprises a lid ring bonded to the laminate carrier with a conductive adhesive and a lid cover coupled to the lid ring with a conductive interconnect, sensor circuitry embedded within the laminate carrier and the laminate carrier-like module lid, the sensor circuitry providing a continuous electrical circuit surrounding the electronic components of the multi-chip module package, and thermal circuitry embedded within the two-piece laminate carrier-like module lid, the thermal circuitry comprising solid copper structures (thru vias) to thermally conduct heat from the electronic components of the multi-chip module package.

According to another embodiment, a multi-chip hardware security module is provided. The multi-chip hardware security module may include a multi-chip module package comprising multiple electronic components packaged onto a laminate carrier, a laminate carrier-like module lid covering the electronic components and secured to the laminate chip carrier with a conductive adhesive, sensor circuitry embedded within the laminate carrier and the laminate carrier-like module lid, the sensor circuitry providing a continuous electrical circuit surrounding the electronic components of the multi-chip module package, and thermal circuitry embedded within the laminate carrier-like module lid, the thermal circuitry comprising solid copper traces to thermally conduct heat from the electronic components of the multi-chip module package.

A laminate carrier-like module lid including multiple laminate layers of non-conductive materials stacked one atop another, sensor circuitry embedded within the laminate carrier-like module lid, the sensor circuitry providing a continuous electrical circuit surrounding the electronic components of the multi-chip module package, and thermal circuitry embedded within the laminate carrier-like module lid, the thermal circuitry comprising solid copper traces to thermally conduct heat from the electronic components of the multi-chip module package.

BRIEF DESCRIPTION OF THE DRAWINGS

The following detailed description, given by way of example and not intended to limit the invention solely thereto, will best be appreciated in conjunction with the accompanying drawings, in which.

Figure 1:
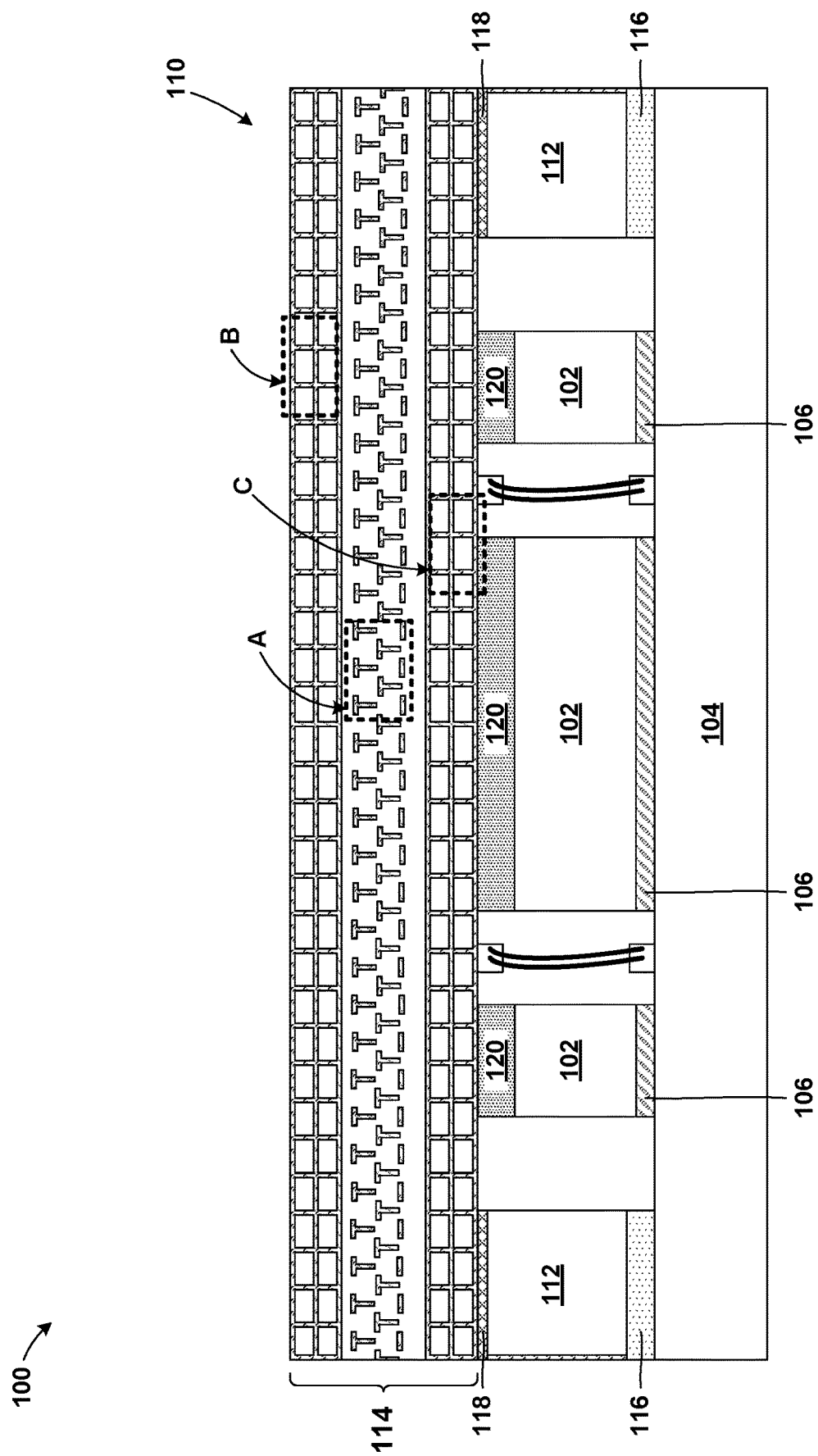
FIG. 1 is cross-sectional view of a module assembly according to an exemplary embodiment.

Elements of the figures are not necessarily to scale and are not intended to portray specific parameters of the invention. For clarity and ease of illustration, scale of elements may be exaggerated. The detailed description should be consulted for accurate dimensions. The drawings are intended to depict only typical embodiments of the invention, and therefore should not be considered as limiting the scope of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

The terms substantially, substantially similar, about, or any other term denoting functionally equivalent similarities refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

There is constant pressure to reduce size and increase performance of electrical components in today's computers. In particular, hardware security modules are ripe for a reduction in size. Conventional hardware security modules (HSMs) are built on PCI (peripheral component interconnect) compliant printed circuit boards which are relatively large and take up valuable space. Changing the form factor of conventional hardware security modules from a PCI compliant printed circuit board format which houses various key components as individually packaged modules on a board to a multi-chip module design which houses the various key components integrated within a single package will enable a smaller package, improve security, and reduce overall cost. Furthermore, shrinking the overall form factor of conventional hardware security modules will be required to support future technologies to meet more stringent federal guidelines for security compliance. Also, future technology systems may not have the room to accommodate a full size or even a half size PCI compliant security card.

Embodiments of the present invention disclose a multi-chip hardware security module; however, building a hardware security module using a multi-chip module form factor comes with challenges. Specifically, building a hardware security module using a multi-chip module form factor presents unique heat dissipation and structural rigidity concerns never before encountered on hardware security modules built on PCI compliant printed circuit boards. First, conventional multi-chip modules are built with a metal or metallic module lid which serves an integral function to transfer or dissipate heat from the multi-chip module. Second, the metal module lid of conventional multi-chip modules also provide necessary structural rigidity to the package in order to prevent cracking during installation, warping during operation, or both. Third, the metal module lid of conventional multi-chip modules does not provide for a tamper detect circuitry and therefore may allow for the module security to be compromised.

As such, the disclosed multi-chip hardware security module however cannot be built with a standard metal module lid. Maintaining a tamper detect physical security envelope is critical to the function of any hardware security module, regardless of its form factor. The tamper detect physical security envelope includes some form of sensor or sensor circuitry completely surrounding the electronic components of the module and provides a tamper-detect package or tamper-respondent package. Maintaining a tamper detect physical security envelope is critical to the functioning of any hardware security module, regardless of its form factor.

In most cases, for example, the sensor circuitry comprises a plurality of closely spaced conductive traces or lines and when one or more of the conducive traces is broken an alarm is generated indicating the package has been physically tampered with. Examples of such sensor circuits are provided in U.S. Pat. Nos. 9,916,744 and 10,143,090, both of which are incorporated by reference herein.

Therefore, a unique module lid design, proposed herein, capable of efficiently dissipating heat away from the chips of the multi-chip module while simultaneously providing the physical security envelope all without compromising structural rigidity is required.

The present invention generally relates to hardware security modules, and more particularly to a thermally enhanced module lid for a multi-chip hardware security module. Exemplary embodiments of a thermally enhanced module lid are described in detail below by referring to the accompanying drawings in FIGS. 1 to 5. Those skilled in the art will readily appreciate that the detailed description given herein with respect to these figures is for explanatory purposes as the invention extends beyond these limited embodiments.

Referring to FIG. 1 a module assembly 100 is shown according to an exemplary embodiment. The module assembly 100 (hereinafter "module"), alternatively an electronic package or multi-chip module (MCM), may include one or more electronic components 102 secured to a laminate carrier 104 with interconnect bumps and an underfill adhesive, collectively labeled 106. The one or more electronic components 102 mounted to the laminate carrier 104 may include one or more of the following: application-specific integrated circuits (ASICs), several hybrid memory cubes (HMCs), high bandwidth memory (HBM), dynamic random-access memory (DRAM) chips, trusted platform modules (TPMs), flash memory, ARM processors, Serial (PC) Electrically Erasable Programmable Read Only Memory (SEEPROM), and capacitors. Some electronic components 102 of the module 100 can generate significant heat and require adequate cooling to preserve module performance, prevent module failure, or both. In a conventional fashion, the module 100 may be attached to a socket or receptacle (not shown) on a processor board by way of, for example, LGA-type or BGA connectors.

The laminate carrier 104 may be any one of several kinds of surface-mount technology substrates used for integrated circuits. Examples include a circuit board, a printed board, a printed circuit board, a multi-layered printed circuit board, an alumina board, a ceramic laminate board, a glass-ceramic laminate board, and organic laminate board etc.

The laminate carrier 104 further includes operational circuitry and sensor circuitry laminated in multiple layers of a non-conductive material or combination of non-conductive materials, such as, for example epoxy, fiberglass reinforced plastic, or polyimide. The operational circuitry includes a plurality of conductive layers and vias to which the electrical components 102 are connected. The sensor circuitry is separate and apart from the operational circuitry, and is used to provide the tamper detect physical security envelope for the module 100.

The module assembly 100 further includes a lid 110 to cover and protect the electronic components 102 of the module 100. The lid 110 further conducts heat away from the electronic components 102 of the module assembly 100. Unlike conventional all-metal lids, the lid 110 has a similar construction, in general, as the laminate carrier 104. For example, the lid 110 is essentially a laminate carrier designed to cover, protect, and effectively remove heat from the electronic components 102 in a manner similar to a metal lid. Like the laminate carrier 104, the lid 110 also includes conductive features laminated in multiple layers of a non-conductive material or combination of non-conductive materials, such as, for example epoxy, fiberglass reinforced plastic, or polyimide. Some of the conductive features of the lid 110 are specifically designed and located to complete the sensor circuitry, while other conductive features of the lid 110 are specifically designed and located to provide adequate thermal conduction to facilitate adequate cooling of the module 100. The conductive features are described in more detail below with reference to FIGS. 2-4.

In an embodiment, the lid 110 is made of multiple pieces including a lid ring 112 and a lid cover 114. As noted above, both the lid ring 112 and the lid cover 114 include conductive features laminated in multiple layers of a non-conductive material or combination of non-conductive materials. Specifically, the lid ring 112 includes conductive features designed and located to complete the sensor circuitry, while the lid cover 114 includes conductive features designed and located to complete the sensor circuitry as well as conductive features to provide adequate thermal conduction to facilitate adequate cooling of the module 100.

In general, the lid ring 112 is a square or rectangular window frame shape with a space or opening in the middle to accommodate the electronic components 102. The shape of the lid ring 112 generally mimics the overall shape of the module 100. For example, a square module 100 will likely be configured with a square lid ring 112, and similarly a square lid cover 114. The exact shape of the lid 110, the lid ring 112 or the lid cover 114 is immaterial to any embodiment of the present invention presented herein.

According to an alternative embodiment, the lid 110 is a single-piece lid with a cavity that encompasses the electronic components mounted to the laminate carrier 104, and a peripheral sealing foot for attachment along the periphery to the laminate carrier 104. In yet another embodiment, the lid 110 is a single congruent laminate structure comprising a cavity that designed to house the electronic components mounted to the laminate carrier 104, and a peripheral sealing foot for attachment along the periphery to the laminate carrier 104.

Although, the module assembly 100 is illustrated and described with a conventional square/rectangle shape, persons of ordinary skill in the art may adapt features of the present invention to accommodate any desired shape. As such, the lid 110, the lid ring 112 or the lid cover 114 may be configured with virtually any shape required by the package designer within manufacturing tolerances.

The lid ring 112 is bonded to a top surface of the laminate carrier 104 with an adhesive 116, such as, for example, Hysol Adhesive. A conductive connection between the laminate carrier 104 and the lid 110 is necessary to maintain continuity of the sensor circuitry which is critical to the operation of the module 100. Further, a mechanical connection between the laminate carrier 104 and the lid 110 is also necessary to provide adequate structural rigidity to the module 100 and prevent damage, for example damage to the electronic components 102. As such, the adhesive 116 should provide the necessary conductive and mechanical connection between the laminate carrier 104 and the lid 110, generally.

Specifically, in the illustrated embodiment, the adhesive 116 provides a conductive and mechanical connection between the laminate carrier 104 and the lid ring 112, and the lid cover 114 is mounted and secured to the lid ring 112. The lid cover 114 is coupled to a top surface of the lid ring 112 with a conductive interconnect 118, such as, for example, mico-vias or a sintered interconnect. The conductive interconnect 118 provides both an electrical and mechanical connection between the lid ring 112 and the lid cover 114. The conductive interconnect 118 provides the necessary conductive connection between the lid ring 112 and the lid cover 114 necessary to maintain continuity of the sensor circuitry.

Further, the lid ring 112 of the present embodiment must have a height equal to or greater than a height of the tallest electronic component 102, or else the laminate lid 110 cannot be installed on the module 100 properly. For example, if the height of the lid ring 112 is less than a height of the tallest electronic component 102, tops of the electronic components 102 would contact an underside of the lid cover 114 and prevent an adequate connection between the lid 110 and the laminate carrier 104 and compromise the sensor circuitry.

During assembly a thermal interface material 120 is sandwiched between the electronic components 102 and the lid 110 to provide adequate thermal conduction from the electronic components 102 to the lid 110 for purposes of cooling the module 100 during operation. In most applications, a heat sink, a cold plate, or other cooling apparatus will be mounted atop the lid 110. As such, the construction of the lid 110 is critical for heat management and a laminate carrier-like lid, unlike a conventional full metal lid, cannot adequately transfer heat from the electronic components 102. However, the lid 110 of the present invention is uniquely configured and specifically designed to adequately transfer heat from the electronic components 102 to preserve module performance, prevent module failure, or both. This is accomplished with the addition of thermal circuitry as described in detail below.

Figure 2:
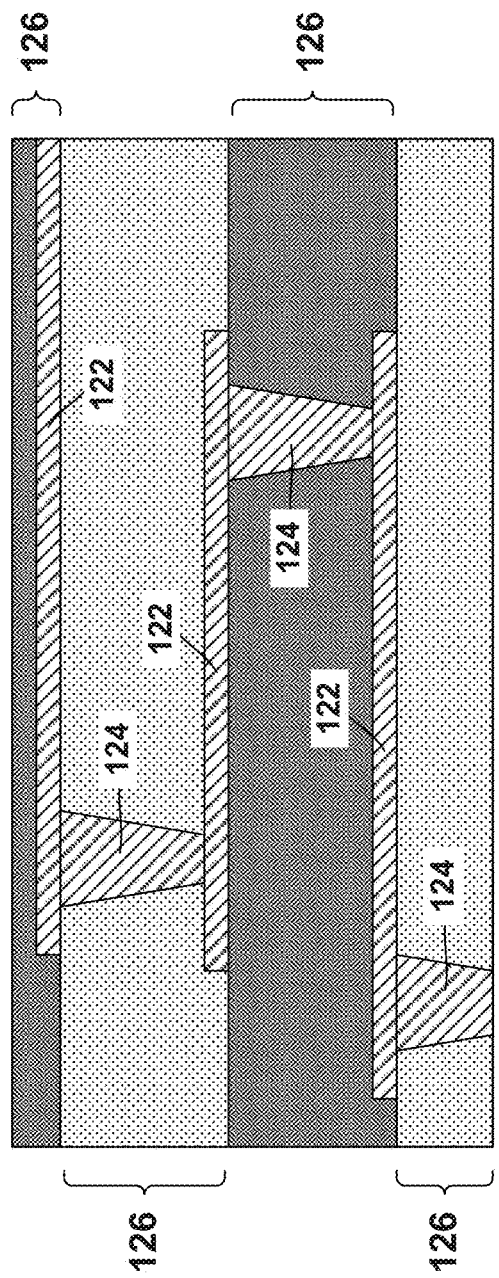
FIG. 2 is a section view, section A, of the module assembly of FIG. 1 according to an exemplary embodiment.
Figure 3:
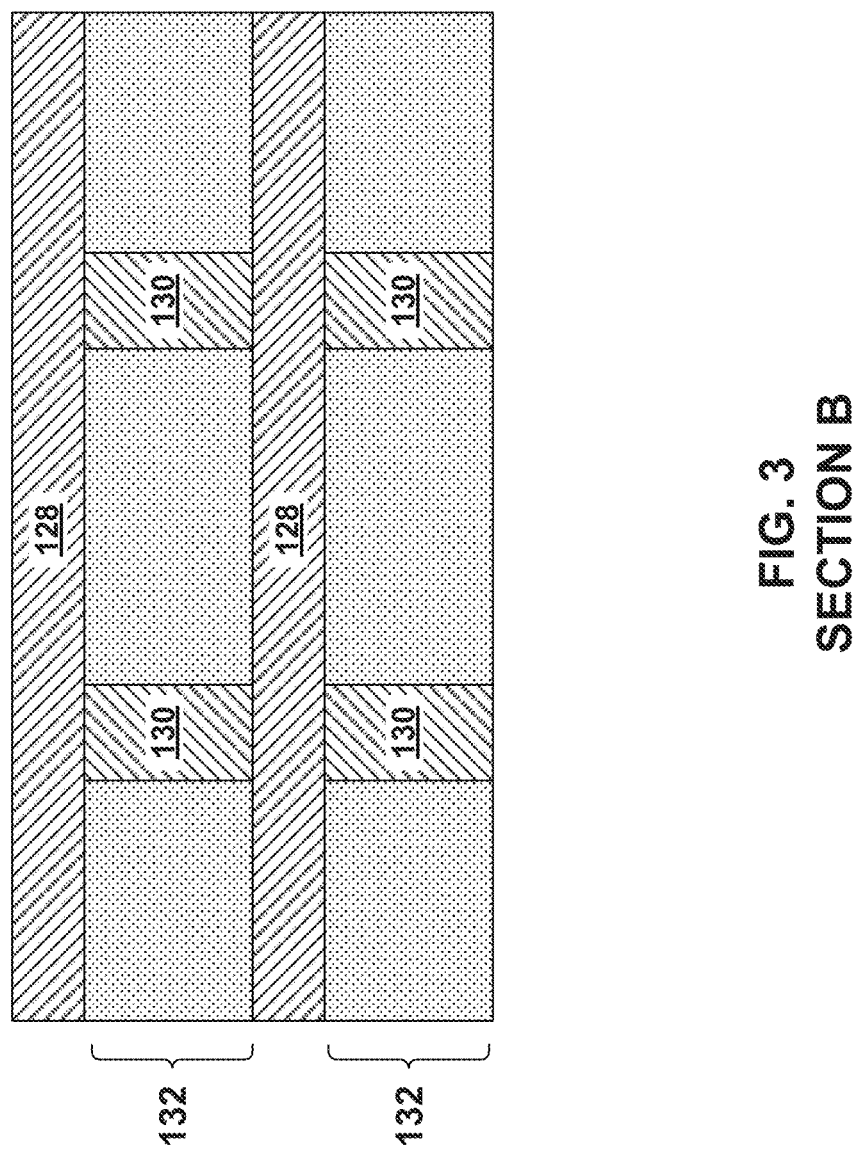
FIG. 3 is a section view, section B, of the module assembly of FIG. 1 according to an exemplary embodiment.
Figure 4:
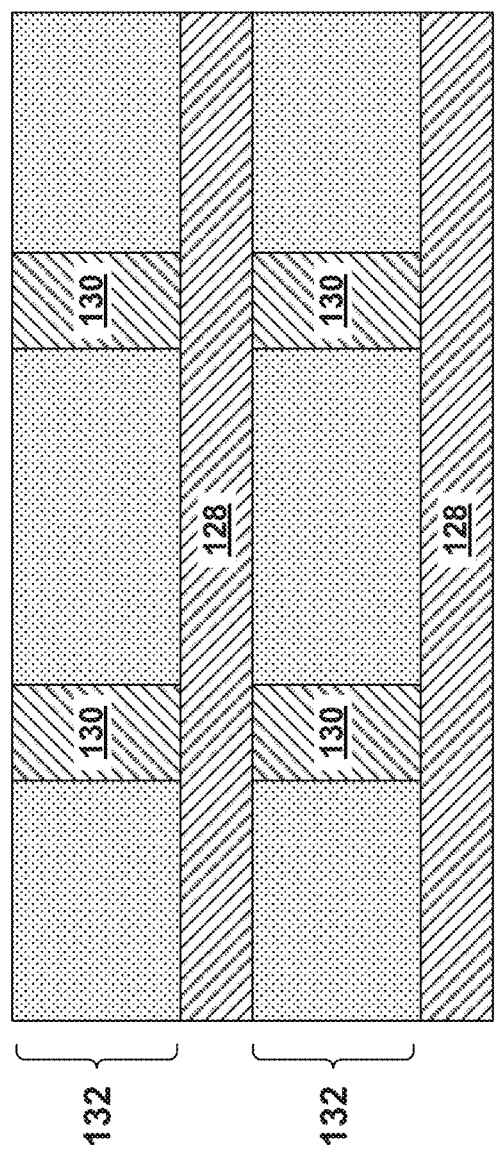
FIG. 4 is a section view, section C, of the module assembly of FIG. 1 according to an exemplary embodiment.

Referring to FIGS. 2-4 multiple cross section views of the lid cover 114 are provided to illustrate examples of the sensor circuitry and thermal circuitry of the module assembly 100. FIG. 2 is a section view, section A, of FIG. 1. FIG. 3 is a section view, section B, of FIG. 1. FIG. 4 is a section view, section C, of FIG. 1.

As previously described the module assembly 100 is fitted with sensor circuitry which completely surrounds the electronic components 102 and provides a tamper detect physical security envelope. In order to completely surround the electronic components 102, the sensor circuitry is provided in the laminate carrier 104, the lid ring 112, and the lid cover 114. Configured with the sensor circuitry, the module 100 is a tamper-detect package or a tamper-respondent package. The sensor circuitry includes anti-tamper sensors and associated circuitry that completely surrounds the electronic components 102 of the module 100. The sensor circuitry is adapted to have a continuous electrical signal distributed throughout. Damage to the sensor circuitry results in a detectable variation in one or more electrical characteristics of the continuous electrical signal, such as, for example, resistance, current, capacitance, or some combination thereof. Variations from pre-defined target values in one or more electrical characteristics are designed to indicate some disruption of the module or trigger an alarm. The sensor circuitry is further electrically coupled to at least one of the electronic components 102 and includes a power source. The sensor circuitry is further adapted to alter or destroy information contained in the at least one electronic component 102 in response to any indication of damage to the sensor circuitry.

With reference to FIG. 2, a portion of the sensor circuitry in the lid cover 114 is shown. As illustrated, the sensor circuitry generally includes metal lines 122 (or traces) and staggered vias 124 integrated across multiple non-conductive layers of the lid cover 114, for example, layers 126. The metal lines 122, or security traces, are relatively thin and made from any suitable conductive material, such as, for example, copper. Since the sensor circuitry is the primary function of the metal lines 122, the line size and material may be chosen according to providing the continuous sensor circuitry. In all cases, the metal lines 122 are expected to be smaller relative to other similar metallic structures of the lid cover 114, for example, the thermal circuitry discussed below. In at least one embodiment, the lid cover 114 includes at least two laminated layers having the sensor circuitry.

Similarly, the staggered vias 124 are relatively small, for example mico-via, and made from any suitable conductive material, such as, for example, copper. Since the sensor circuitry is the primary function of the staggered vias 124, the size and material may be chosen according to providing the continuous sensor circuitry. In all cases, the staggered vias 124 are expected to be smaller relative to other similar metallic structures of the lid 110, for example, the thermal circuitry. The sensor circuitry illustrated and descried above with reference to the lid cover 114 is representative of any sensor circuitry provided in the laminate carrier 104 or the lid ring 112.

As previously described the module assembly 100 is fitted with thermal circuitry which is uniquely configured and specifically designed to adequately transfer heat from the electronic components 102 to preserve module performance, prevent module failure, or both. In an embodiment, the thermal circuitry is provided only in the lid cover 114, as illustrated; however, the thermal circuitry can be integrated into other components of the module assembly 100 without undue experimentation.

With reference to FIGS. 3 and 4, portions of the thermal circuitry in the lid cover 114 are shown. As illustrated, the thermal circuitry includes a network of thick metal layers 128 and thermal through-vias 130 integrated across multiple non-conductive layers of the lid 110, for example, layers 132.

In most cases, the thermal circuitry includes multiple thick metal layers 128 physically joined by multiple thermal through-vias 130, as illustrated in FIGS. 3 and 4. In an embodiment, for example, the thermal circuitry includes solid copper planes (128) on a top surface of the lid cover 114 and a bottom surface of the lid cover 114, and thermal through-vias (130) in direct contact with the solid copper planes (128). In general, the thermal circuitry should have enough thermal mass to efficiently and effectively conduct heat from the electronic components 102 for dissipation by a heat sink or other cooling apparatus. Without the thermal circuitry, the lid 110 of the present invention may cause the module assembly 100 to heat up thereby causing degradation in performance and/or module failure. Ultimately, the thickness or size of the thick metal layers 128 and thermal through-vias 130 must be optimally designed for heat spreading and conduction while also supporting the sensor circuitry's ability to adequately detect a tamper and manufacturability of the lid 110 balanced with the thickness of the individual layers of non-conductive material. For example, while relatively thinner traces are preferable for heat conduction through the vertical (z) direction, relatively thicker traces provide better heat spreading in the lateral (x, y) direction. Similarly, many shorter and thicker copper vias may be better for heat conduction; however, doing so might be constrained by electrical design criteria and manufacturability of the module.

The sensor circuitry and the thermal circuitry can be configured in any number of configurations provided they each provide the necessary advantages and performance noted above. In the present embodiment, the sensor circuitry is generally located in the central layers of the lid cover 114 and the thermal circuitry is generally located in the upper most layers adjacent to a top surface of the lid cover 114 and lower most layers adjacent to a bottom surface of the lid cover 114. In an alternative embodiment, the sensor circuitry can be located in the upper most layers of the lid cover 114 while the thermal circuitry can be located in the central and lower most layers of the lid cover 114. In yet another embodiment, the sensor circuitry can be located in the lower most layers of the lid cover 114 while the thermal circuitry can be located in the central and upper most layers of the lid cover 114. According to another embodiment, the sensor circuitry can be located in the lower most layers of the lid cover 114 and the upper most layers of the laminate carrier 104 closest to the electronic components 102. In all cases, thermal efficiency is maximized when both the heat sink and the thermal interface material atop the electronic components 102 directly contacts at least a portion of the thermal circuitry.

Figure 5:
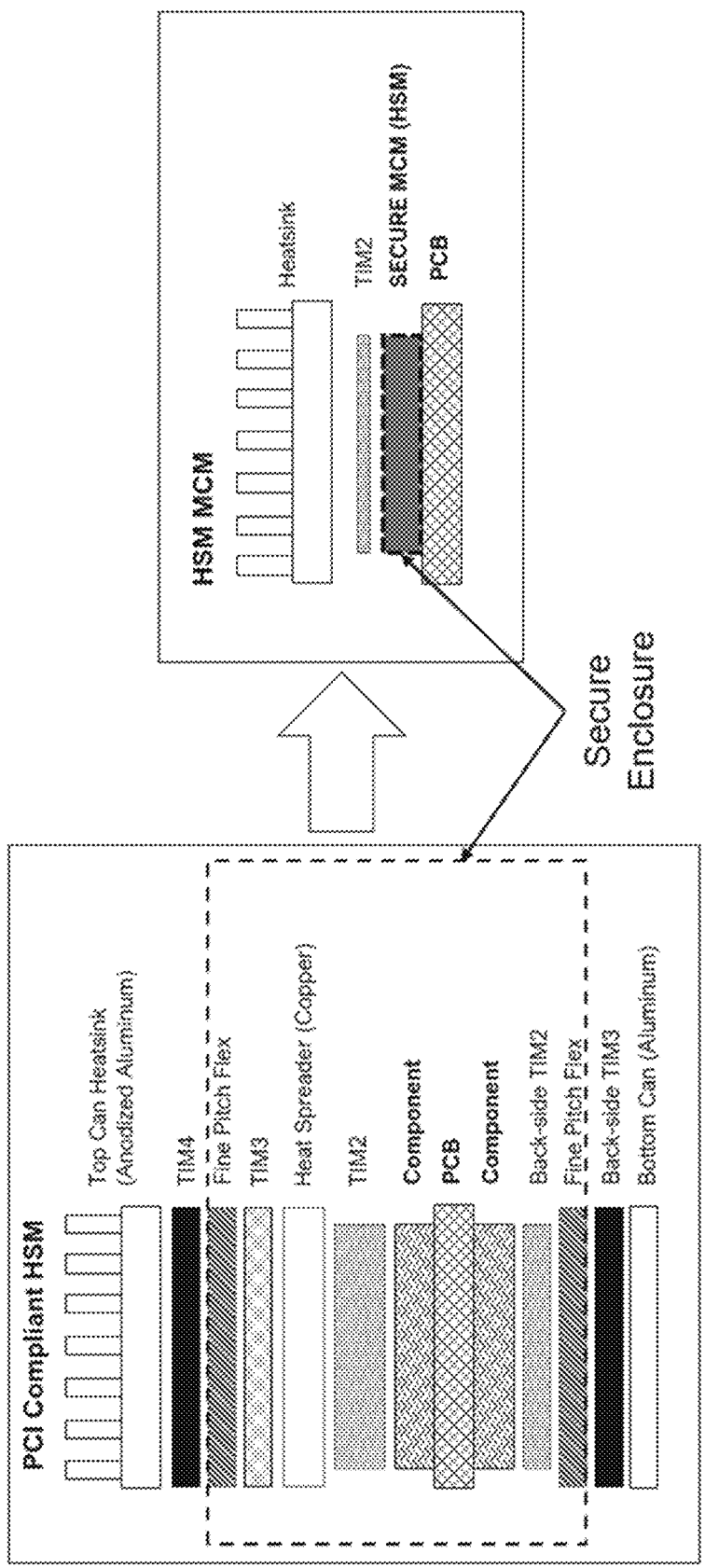
FIG. 5 illustrates assembly of a PCI Compliant HSM as compared with an MCM HSM according to an exemplary embodiment.

Referring to FIG. 5 illustrates the simplified assembly of the module assembly 100 as compared with conventional PCI compliant HSMs. First, as is evident from the figure, the module assembly 100 depicted on the right presents a significant reduction in size over the prior solution illustrated on the left. This is accomplished by reducing the number of structural layers in the package to improve both security and thermal conduction. For example, the module assembly 100 of the present invention requires a smaller tamper detect security envelope. Stated differently, less structure and fewer components are included in the tamper detect security envelop of the module assembly 100 as compared with prior structures. In turn, the module assembly 100 is less complicated, contains fewer layers/interfaces, easier to manufacture and easier to assemble.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A multi-chip hardware security module comprising:
    a multi-chip module package comprising multiple electronic components packaged onto a laminate carrier;
    a two-piece laminate carrier-like module lid covering the electronic components and secured to the laminate carrier, wherein the two-piece laminate carrier-like module lid comprises a hollow lid ring bonded to the laminate carrier with a conductive adhesive and a lid cover coupled to the lid ring with a conductive interconnect;
    sensor circuitry embedded within the laminate carrier and the laminate carrier-like module lid, the sensor circuitry providing a continuous electrical circuit surrounding the electronic components of the multi-chip module package; and
    thermal circuitry embedded within the two-piece laminate carrier-like module lid, the thermal circuitry comprising solid copper structures to thermally conduct heat from the electronic components of the multi-chip module package.

2. The multi-chip hardware security module according to claim 1, further comprising:
    a thermal interface material sandwiched between the electronic components of the multi-chip module package and the laminate carrier-like module lid.

3. The multi-chip hardware security module according to claim 1, wherein the continuous electrical circuit is electrically connected to a power source and damage to the continuous electrical circuit results in a detectable variation in one or more electrical characteristics of the continuous electrical circuit.

4. The multi-chip hardware security module according to claim 1, wherein the sensor circuitry comprises multiple metal traces connected by multiple staggered vias.

5. The multi-chip hardware security module according to claim 1, wherein the thermal circuitry comprises a first layer of circuitry adjacent to a top surface of the lid cover and a second layer of circuitry adjacent to a bottom surface of the lid cover.

6. The multi-chip hardware security module according to claim 1, wherein the thermal circuitry comprises solid copper planes on a top surface of the lid cover and a bottom surface of the lid cover, and thermal vias in direct contact with the solid copper planes.

7. The multi-chip hardware security module according to claim 1, wherein the thermal circuitry comprises through vias in outermost layers adjacent to top and bottom surfaces of the laminate carrier-like module lid, and the sensor circuitry comprises staggered vias in internal layers of the laminate carrier-like module lid.

8. A multi-chip hardware security module comprising:
    a multi-chip module package comprising multiple electronic components packaged onto a laminate carrier;
    a laminate carrier-like module lid covering the electronic components and secured to the laminate carrier with a conductive adhesive;
    sensor circuitry embedded within the laminate carrier and the laminate carrier-like module lid, the sensor circuitry providing a continuous electrical circuit surrounding the electronic components of the multi-chip module package, wherein the sensor circuitry comprises staggered vias in internal layers of the laminate carrier-like module lid; and
    thermal circuitry embedded within the laminate carrier-like module lid, the thermal circuitry comprising solid copper traces and through vias in outermost layers adjacent to top and bottom surfaces of the laminate carrier-like module lid.

9. The multi-chip hardware security module according to claim 8, further comprising:
    a thermal interface material sandwiched between the electronic components of the multi-chip module package and the laminate carrier-like module lid.

10. The multi-chip hardware security module according to claim 8, wherein the continuous electrical circuit is electrically connected to a power source and damage to the continuous electrical circuit results in a detectable variation in one or more electrical characteristics of the continuous electrical circuit.

11. The multi-chip hardware security module according to claim 8, wherein the sensor circuitry comprises multiple metal traces connected by the staggered vias.

12. The multi-chip hardware security module according to claim 8, wherein the thermal circuitry comprises a first layer of circuitry adjacent to the top surface of the laminate carrier-like module lid and a second layer of circuitry adjacent to the bottom surface of the laminate carrier-like module lid.

13. The multi-chip hardware security module according to claim 8, wherein the thermal circuitry comprises solid copper planes on the top surface of the laminate carrier-like module lid and the bottom surface of the laminate carrier-like module lid, and wherein the through vias are in direct contact with the solid copper planes.

14. The multi-chip hardware security module according to claim 8, wherein the laminate carrier-like module lid comprises a cavity that encompasses the electronic components mounted to the laminate carrier, and a peripheral sealing foot for attachment along the periphery to the laminate carrier.

15. A laminate carrier-like module lid comprising:
    multiple laminate layers of non-conductive materials stacked one atop another;
    sensor circuitry embedded within the laminate carrier-like module lid, wherein the sensor circuitry comprises staggered vias in internal layers of the laminate carrier-like module lid; and
    thermal circuitry embedded within the laminate carrier-like module lid, the thermal circuitry comprising solid copper traces and through vias in outermost layers adjacent to top and bottom surfaces of the laminate carrier-like module lid.

16. The laminate carrier-like module lid according to claim 15, wherein laminate carrier-like module lid comprises a single congruent laminate structure comprising a cavity.

17. The laminate carrier-like module lid according to claim 15, further comprising:
a lid ring; and
lid cover coupled to the lid ring with a conductive interconnect, wherein the sensor circuitry is embedded into both the lid ring and the lid cover, and the thermal circuitry is embedded into only the lid cover.

18. The laminate carrier-like module lid according to claim 15, wherein the sensor circuitry comprises multiple metal traces connected by the staggered vias.

* * * * *